(12) United States Patent
Chen

(10) Patent No.: US 6,309,451 B1
(45) Date of Patent: Oct. 30, 2001

(54) AIR FILTERING DEVICE FOR AN AUTOMOBILE

(76) Inventor: Chung-Hsuan Chen, 16F-3, No. 107, Huang-Hsing Rd., San Min Dist., Kaohsiung City (TW)

( * ) Notice: Subject to any disclaimer, the term of this patent is extended or adjusted under 35 U.S.C. 154(b) by 0 days.

(21) Appl. No.: 09/491,773

(22) Filed: Jan. 26, 2000

(51) Int. Cl.$^7$ .............. B01D 53/04; B01D 46/10
(52) U.S. Cl. .............. 96/134; 96/154; 55/385.3; 55/486
(58) Field of Search ............... 55/385.1, 385.3, 55/485, 486; 96/134, 135, 153, 154

(56) References Cited

U.S. PATENT DOCUMENTS

| | | | |
|---|---|---|---|
| 4,181,513 | * | 1/1980 | Fukuda et al. ............... 96/153 |
| 4,261,717 | * | 4/1981 | Belore et al. ............... 96/135 X |
| 4,382,440 | * | 5/1983 | Kapp et al. ............... 96/134 |
| 4,610,705 | * | 9/1986 | Sarnosky et al. ............... 96/134 X |
| 4,863,499 | * | 9/1989 | Osendorf ............... 96/134 |
| 5,350,444 | * | 9/1994 | Gould et al. ............... 96/153 X |
| 5,423,903 | * | 6/1995 | Schmitz et al. ............... 96/134 |
| 5,690,719 | * | 11/1997 | Hodge ............... 6/134 X |
| 5,718,743 | * | 2/1998 | Donnelly et al. ............... 96/135 |
| 5,865,863 | * | 2/1999 | DeSousa et al. ............... 55/385.3 |
| 5,900,032 | * | 5/1999 | Wang ............... 55/385.3 |

FOREIGN PATENT DOCUMENTS

| | | | |
|---|---|---|---|
| 54-023094 | * | 2/1979 | (JP) ............... 96/134 |
| 57-167715 | * | 10/1982 | (JP) ............... 96/134 |

* cited by examiner

*Primary Examiner*—Robert H. Spitzer
(74) *Attorney, Agent, or Firm*—Darby & Darby

(57) ABSTRACT

An air filtering device includes an inner seat member, an outer seat member, and a multi-layer filter medium. The inner seat member has opposed first and second sides and a plurality of first air passages extending therethrough from the first side to the second side. The outer seat member has opposed third and fourth sides and a plurality of second air passages extending therethrough from the third side to the fourth side. The multi-layer filter medium is sandwiched between the second side of the inner seat member and the third side of the outer seat member. The multi-layer filter medium has a polypropylene fabric layer, a far-infrared radiation material layer, and an activated carbon fiber layer connected to one another. The first air passages are registered with the second air passages.

4 Claims, 3 Drawing Sheets

AIR FILTERING DEVICE FOR AN AUTOMOBILE

BACKGROUND OF THE INVENTION

1. Field of the Invention

This invention relates to an air filtering device, more particularly to an air filtering device for an automobile.

2. Description of the Related Art

Referring to FIG. 1, a conventional air filter 1 for an automobile is shown to include an air inlet 10 and an air outlet 11. A connecting tube 12 interconnects the air outlet 11 and a cylinder 13. An air filtering member 14 is disposed in the air filter 1. The air filtering member 14 is made of a sponge material and/or a pelletized activated carbon material. As such, when air flows through the conventional air filter 1 into the cylinder 13 via the connecting tube 12, the impurities in the air can be removed by the air filtering member 14 to obtain clean air that is in turn mixed with fuel in the cylinder 13.

However, the conventional air filter 1 suffers from the following disadvantages:

1. The air-flowing speed in the air filter 1 will be reduced by the air filtering member 14. Therefore, the filtered air cannot be quickly supplied to the cylinder 13, thus resulting in a poor fuel burning efficiency in the cylinder 13.

2. Only a part of the impurities in the air is removed by the air filtering member 14. The filtering effect of the air filtering member 14 is not satisfactory.

3. Since the impurities in the air are not completely removed by the air filtering member 14, the fuel in the cylinder 13 can not be burned completely, thereby producing harmful gases that exit subsequently from the cylinder 13 and that pollute the air.

SUMMARY OF THE INVENTION

The object of the present invention is to provide an air filtering device which can overcome the disadvantages that are commonly associated with the aforementioned conventional air filter for an automobile.

According to one aspect of the present invention, an air filtering device comprises an inner seat member, an outer seat member, and a multi-layer filter medium. The inner seat member has opposed first and second sides and a plurality of first air passages extending therethrough from the first side to the second side. The outer seat member has opposed third and fourth sides and a plurality of second air passages extending therethrough from the third side to the fourth side. The multi-layer filter medium is sandwiched between the second side of the inner seat member and the third side of the outer seat member. The multi-layer filter medium has a polypropylene fabric layer, a far-infrared radiation material layer, and an activated carbon fiber layer connected to one another. The first air passages are registered with the second air passages.

According to another aspect of the present invention, an air filtering device comprises a molded inner seat member, a molded outer seat member, and a multi-layer filter medium. The inner seat member has opposed first and second sides and a plurality of first air passages extending therethrough from the first side to the second side. The outer seat member has opposed third and fourth sides and a plurality of second air passages extending therethrough from the third side to the fourth side. Each of the inner and outer seat members contains a far-infrared radiation material molded therein. The multi-layer filter medium is sandwiched between the second side of the inner seat member and the third side of the outer seat member. The multi-layer filter medium has a polypropylene fabric layer and an activated carbon fiber layer connected to one another. The first air passages are registered with the second air passages.

Preferably, the first and second air passages are tapered from the first side to said fourth side.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
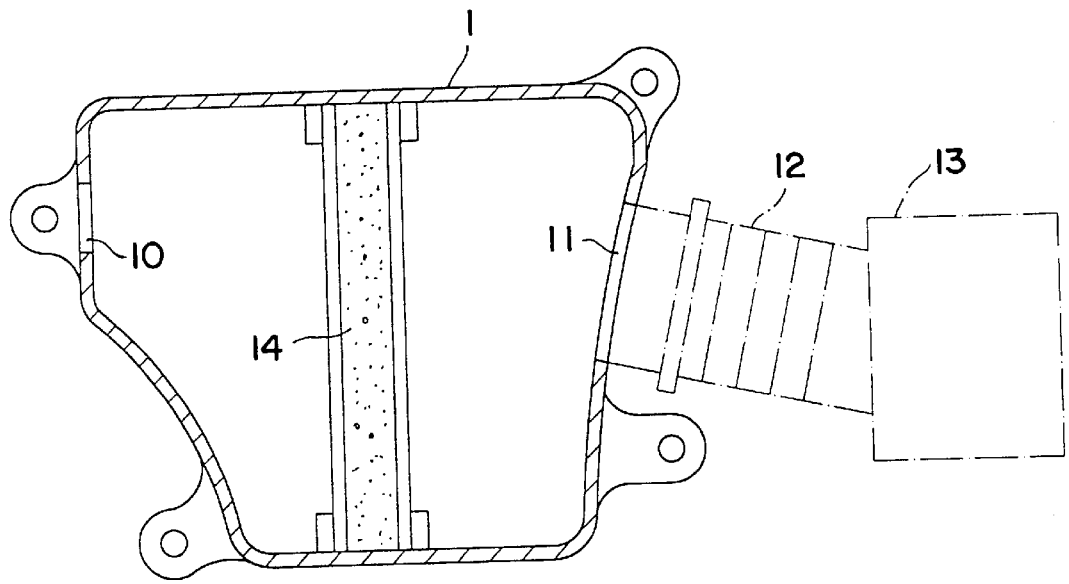
FIG. 1 is a cross-sectional schematic view of a conventional air filter that is connected to a cylinder of an automobile via a connecting tube.
Figure 2:
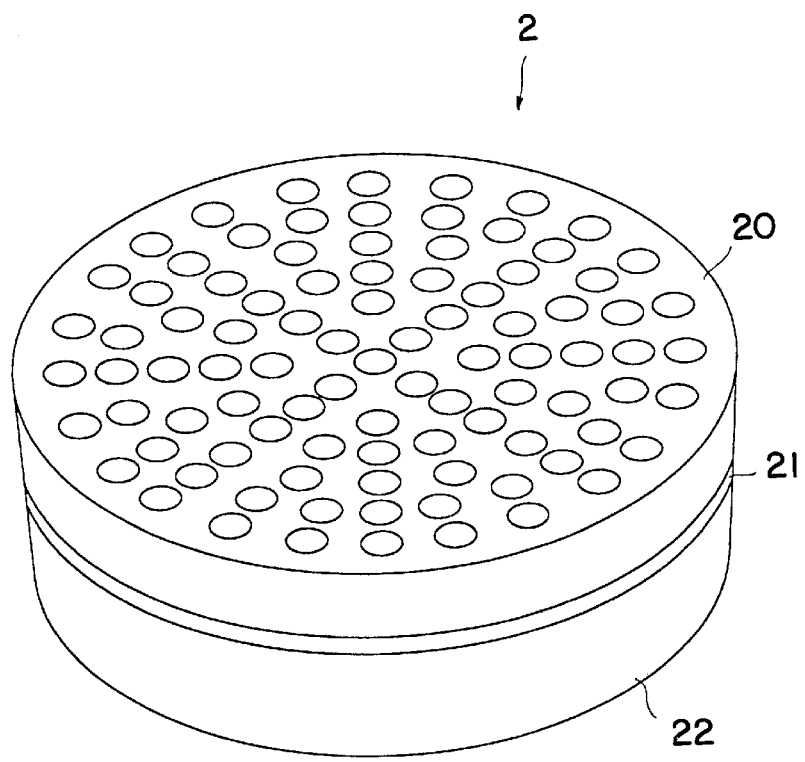
FIG. 2 is a perspective view of a first preferred embodiment of an air filtering device according to the present invention.
Figure 3:
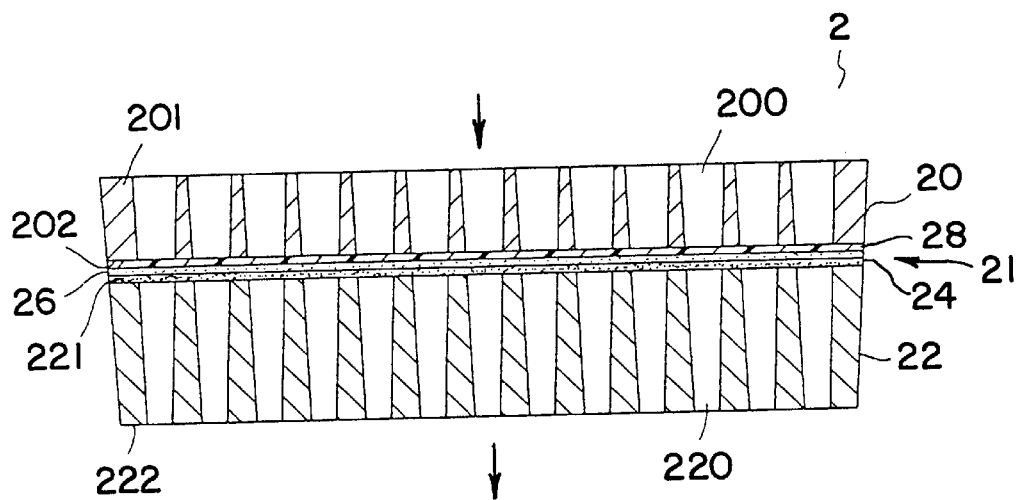
FIG. 3 is a cross-sectional view of the first preferred embodiment of the air filtering device according to the present invention.

Referring to FIGS. 2 and 3, a first preferred embodiment of an air filtering device 2 according to the present invention is shown to comprise a circular inner seat member 20, a circular outer seat member 22, and a multi-layer filter medium 21. The inner seat member 20 has opposed first and second sides 201, 202 and a plurality of first air passages 200 extending therethrough from the first side 201 to the second side 202. The outer seat member 22 has opposed third and fourth sides 221, 222 and a plurality of second air passages 220 extending therethrough from the third side 221 to the fourth side 222. The multi-layer filter medium 21 is sandwiched between the second side 202 of the inner seat member 20 and the third side 221 of the outer seat member 22. The multi-layer filter medium 21 has a polypropylene fabric layer 28, a far-infrared radiation material layer 26, and an activated carbon fiber layer 24 connected to one another. The polypropylene fabric layer 28 is adjacent to the second side 202 of the inner seat member 20. The activated carbon fiber layer 24 is adjacent to the third side 221 of the outer seat member 22. The far-infrared radiation material layer 26 is sandwiched between the polypropylene fabric layer 28 and the activated carbon fiber layer 24. The polypropylene fabric layer 28 is formed as a net filtering member. The activated carbon fiber layer 24 is made of activated carbon fibers that are conventionally used to fabricate a woven cloth and that have an excellent absorbing characteristic. It is found, by experiment, that the absorbing ability of the activated carbon fibers is over thirty times that of pelletized activated carbon. The far-infrared radiation material layer 26 is capable of exciting air molecules.

The first air passages 200 are registered with the second air passages 220. The first and second air passages 200, 220 are tapered from the first side 201 to the fourth side 222. That is, the diameters of the first and second air passages

200, 220 decrease gradually from the first side 201 to the fourth side 222, as best illustrated in FIG. 3.

Figure 4:
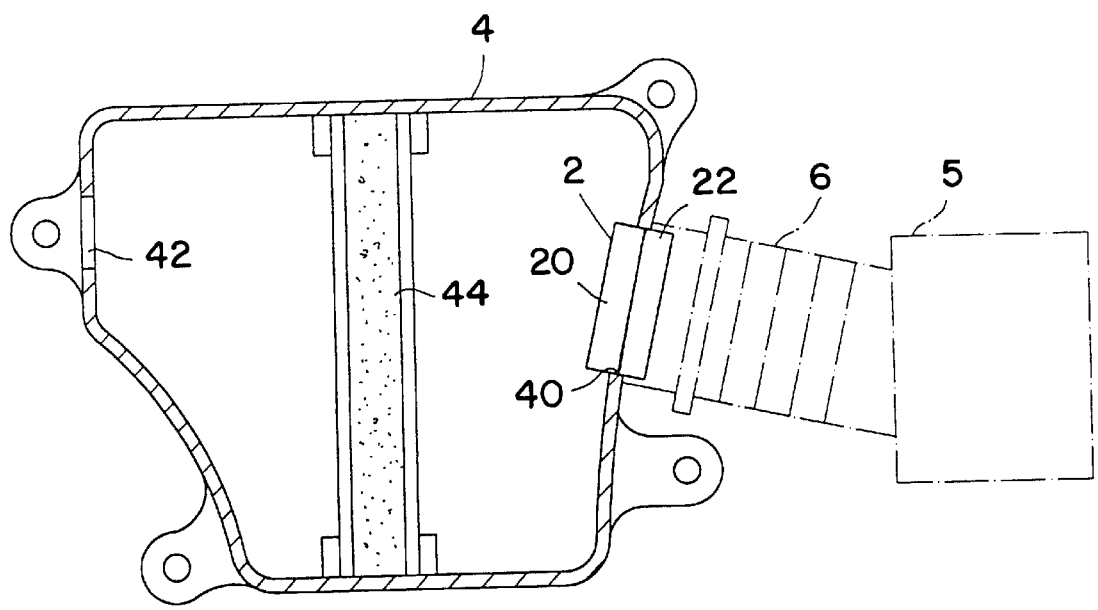
FIG. 4 is a schematic view illustrating how the air filtering device of the first preferred embodiment is used with a conventional air filter for an automobile.

Referring to FIG. 4, the air filtering device 2 may be used with a conventional air filter 4 to increase the air filtering effect of the latter. The air filter 4 has the same construction as the aforementioned conventional air filter 1, and has an air inlet 42, an air outlet 40 that is connected to a cylinder 5 via a connecting tube 6, and an air filtering member 44 disposed in the air filter 4. The air filtering device 2 is connected to the air filter 4 at the air outlet 40. The inner seat member 20 is disposed internally of the air filter 4, while the outer seat member 22 is disposed externally of the air filter 4 in the connecting tube 6. When air flows through the air filter 4 and the air filtering device 2 into the cylinder 5 via the connecting tube 6, large air impurities are first removed from the air by the air filtering member 44 and are further removed by the polypropylene fabric layer 28 in the air filtering device 2. The smaller air impurities are removed by the activated carbon fiber layer 24. When the air passes through the multi-layer filter medium 21, the air molecules will be excited by the far-infrared rays emitted from the far-infrared radiation material layer 26. In addition, the flow rate of the air is effectively increased when the air passes through the first and second air passages 200, 220 in the inner and outer seat members 20, 22 due to the configurations of the latter. As such, cleaner and excited air can be fed into the cylinder 5, thus resulting in an enhanced fuel burning efficiency in the cylinder 5. Moreover, less harmful substances are exhausted from the cylinder 5.

Figure 5:
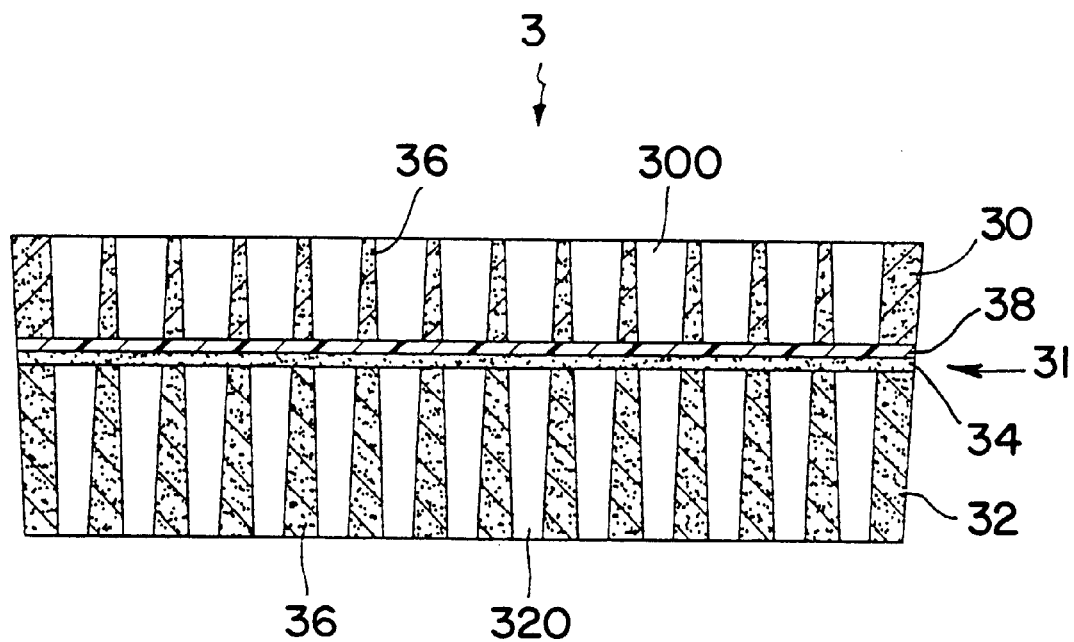
FIG. 5 is a cross-sectional view of a second preferred embodiment of the air filtering device according to the present invention.

Referring to FIG. 5, a second preferred embodiment of an air filtering device 3 according to the present invention is shown to comprise a molded inner seat member 30, a molded outer seat member 32, and a multi-layer filter medium 31 sandwiched between the inner and outer seat members 30, 32. The inner and outer seat members 30, 32 are provided respectively with first and second air passages 300, 320 that are registered with one another and that are tapered from the inner seat member 30 to the outer seat member 32 in a manner similar to that in the first preferred embodiment. The multi-layer filter medium 31 has a polypropylene fabric layer 38 and an activated carbon fiber layer 34 connected to one another. The inner and outer seat members 30, 32 are molded of plastic with a far-infrared radiation material 36. As such, the air molecules can be excited by the far-infrared ray emitted from the far-infrared radiation material 36 when the air passes through the air filtering device 3. Moreover, the air can be filtered and accelerated by the air filtering device 3 in a manner similar to that in the first preferred embodiment.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. An air filtering device, comprising:
    an inner seat member having opposed first and second sides and a plurality of first air passages extending therethrough from said first side to said second side;
    an outer seat member having opposed third and fourth sides and a plurality of second air passages extending therethrough from said third side to said fourth side; and
    a multi-layer filter medium sandwiched between said second side of said inner seat member and said third side of said outer seat member, said multi-layer filter medium having a polypropylene fabric layer, a far-infrared radiation material layer, and an activated carbon fiber layer connected to one another, said first air passages being registered with said second air passages.

2. The air filtering device as claimed in claim 1, wherein said first and second air passages are tapered from said first side to said fourth side.

3. An air filtering device, comprising:
    a molded inner seat member having opposed first and second sides and a plurality of first air passages extending therethrough from said first side to said second side;
    a molded outer seat member having opposed third and fourth sides and a plurality of second air passages extending therethrough from said third side to said fourth side, each of said inner and outer seat members containing a far-infrared radiation material molded therein; and
    a multi-layer filter medium sandwiched between said second side of said inner seat member and said third side of said outer seat member, said multi-layer filter medium having a polypropylene fabric layer and an activated carbon fiber layer connected to one another, said first air passages being registered with said second air passages.

4. The air filtering device as claimed in claim 3, wherein said first and second air passages are tapered from said first side to said fourth side.

* * * * *